(12) United States Patent
Garney et al.

(10) Patent No.: US 6,418,538 B1
(45) Date of Patent: *Jul. 9, 2002

(54) METHOD AND SYSTEM FOR SCHEDULING TRANSACTIONS OVER A HALF DUPLEX LINK

(75) Inventors: John I. Garney, Aloha; Brent S. Baxter, Hillsboro, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,321

(22) Filed: Dec. 23, 1998

Related U.S. Application Data (63) Continuation-in-part of application No. 09/110,344, filed on Jul. 6, 1998.

(51) Int. Cl.[7] .................................................. G06F 1/04
(52) U.S. Cl. ........................ 713/502; 713/501; 710/21; 710/45; 710/60
(58) Field of Search ................................. 713/500, 501, 713/502, 601, 503, 600; 709/208; 710/20, 21, 60, 115, 80, 31, 36, 45, 61, 117

(56) References Cited

U.S. PATENT DOCUMENTS

| | | | | |
|---|---|---|---|---|
| 5,197,125 A | * | 3/1993 | Engel et al. ................. | 709/200 |
| 5,386,435 A | * | 1/1995 | Cooper .......................... | 375/1 |
| 5,504,900 A | * | 4/1996 | Raz ............................. | 395/650 |
| 5,513,368 A | * | 4/1996 | Garcia et al. ................. | 710/22 |
| 5,521,926 A | * | 5/1996 | Ayerst et al. ................ | 370/953 |
| 5,533,200 A | * | 7/1996 | Dobbins et al. ............. | 710/100 |
| 5,546,543 A | * | 8/1996 | Yang et al. .................. | 395/250 |
| 5,619,361 A | * | 4/1997 | Sagesaka et al. ........... | 345/472 |
| 5,898,666 A | * | 4/1999 | Fukuda ........................ | 370/280 |
| 5,898,848 A | * | 4/1999 | Gulick ........................ | 710/128 |
| 5,961,623 A | * | 10/1999 | James et al. ................. | 710/113 |
| 6,067,591 A | * | 5/2000 | Howard et al. ............. | 710/100 |

\* cited by examiner

*Primary Examiner*—Jeffrey Gaffin
*Assistant Examiner*—Rijue Mai
(74) *Attorney, Agent, or Firm*—Kenyon & Kenyon

(57) ABSTRACT

Transactions are scheduled over a half duplex link between a first device and a second device. Information flowing over the half duplex link is divided into a plurality of service periods. According to one embodiment of the present invention, the transfer of a read request transaction, from the first device to the second device, is scheduled in one service period. The transfer of a write transaction, from the first device to the second device, is scheduled such that the write transaction will not be transferred across the half duplex link in the same service period as returning memory read data is transferred across the half duplex link. According to another embodiment of the present invention, a first transaction associated with a first agent is scheduled in a first service period according to a global schedule. The global schedule associates the first service period with the first agent. A second transaction associated with a second agent is scheduled in a second service period according to the global schedule. The global schedule associates the second service period with the second agent.

23 Claims, 8 Drawing Sheets

Multiplexed, return and write transactions transferred over half duplex link 522 (L=4)

| agent | Time (SP) | Service period |
|---|---|---|
| IIOB USB1 R | | |
| IIOB USB1 W | | |
| IIOB USB1 T | | |
| IIOB USB2 R | | |
| IIOB USB2 W | | |
| IIOB USB2 T | | |
| IIOB AC97 R | A — B — C — A | |
| IIOB AC97 W | | |
| IIOB AC97 T | 1 2 3 — 1 2 3 4 5 6 — 1 2 3 4 5 6 — 1 2 3 4 5 6 — 1 2 | |
| IIOB I13B R | | |
| IIOB I13B W | | |
| IIOB I13B T | 1 2 3 4 5 6 — 1 2 3 4 5 6 — 1 2 3 4 5 6 | | ial
METHOD AND SYSTEM FOR SCHEDULING TRANSACTIONS OVER A HALF DUPLEX LINK

CROSS REFERENCE TO RELATED APPLICATIONS

The present invention is a continuation-in-part of U.S. patent application Ser. No. 09/110,344, entitled "Architecture for the Isochronous Transfer of Information Within a Computer System," to John I. Garney and Brent S. Baxter, filed on Jul. 6, 1998 and assigned to Intel Corporation.

FIELD

The present invention relates to the transfer of information in a computer system. More particularly, the present invention relates to a half duplex link protocol for isochronous transactions.

BACKGROUND

Information, such as information representing audio, video and multimedia content, can be transferred within a computer system. Consider, for example, FIG. 1, which illustrates a known architecture for connecting an external Input Output (IO) device 10 to a computer system 100. The computer system 100 includes a processor 110 coupled to a main memory 200 through a memory controller 300. The external IO device 10 communicates with an IO unit 400, which is also coupled to the memory controller 300.

Figure 1:
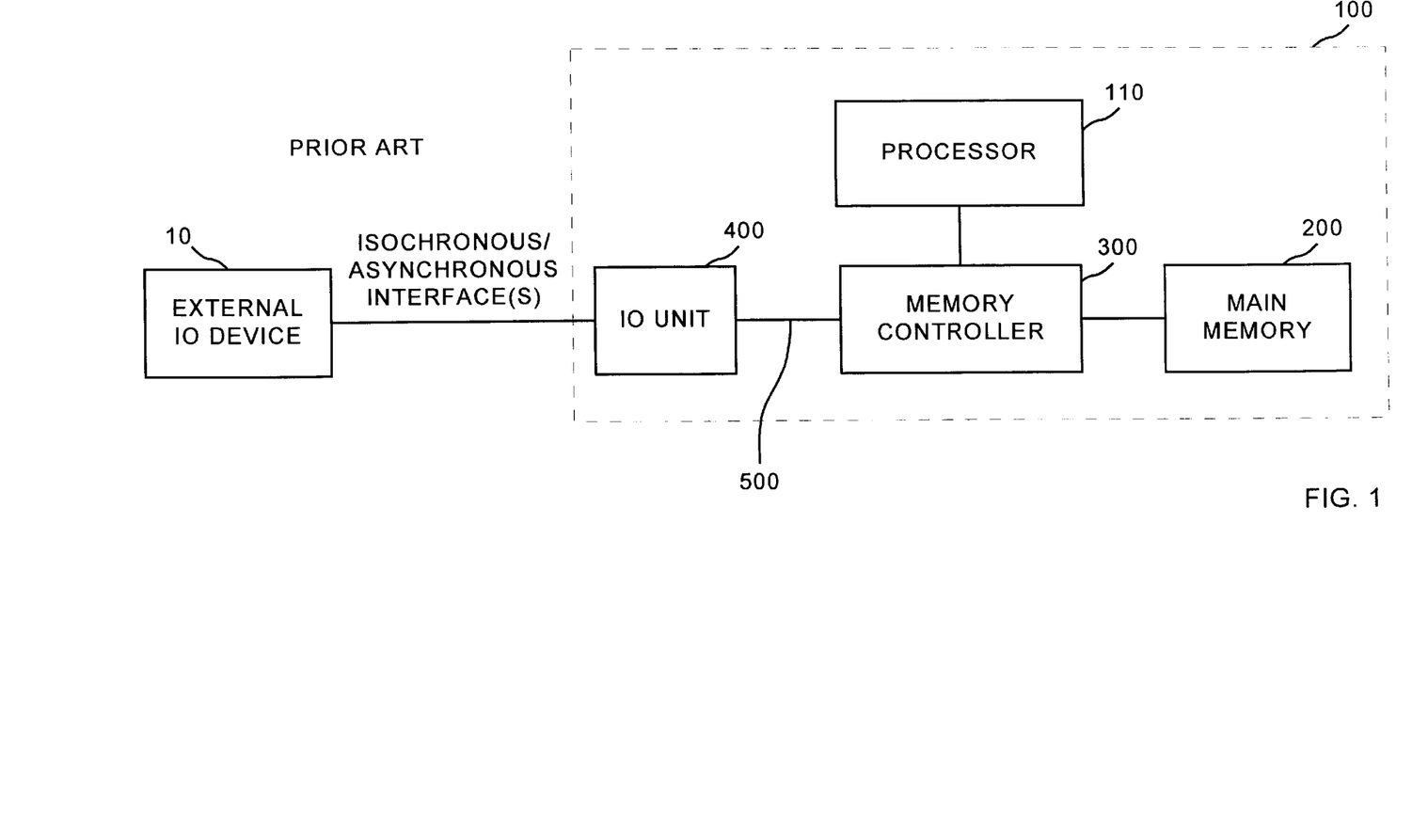
FIG. 1 illustrates a known architecture for connecting an external IO device to a computer system.

The external IO device 10 can, for example, transfer "asynchronous" information with the IO unit 400, which in turn transfers information with the memory controller 300. When a transfer of information is asynchronous, delays can occur that interfere with the timely completion of the transfer. Typically, other, more important, activities can delay an information transfer without adversely impacting system performance. In some types of information streams, however, even a minor delay or gap will noticeably degrade the quality of the information, such as by causing a momentary freeze in a video transmission or by introducing a stuttering effect in an audio transmission.

When a transfer of information is "isochronous," a sending and receiving device are partly synchronized, generally without using the same clock signal, and the sending device transfers information to the receiving device at regular intervals. Such transfers can be used, for example, when information needs to arrive at the receiving device at the same rate it is sent from the sending device, but without precise synchronization of each individual data item. The IEEE 1394 standard (1995), entitled "High Performance Serial Bus" and available from the Institute of Electrical and Electronic Engineers, is one example of an interface that supports the isochronous transfer of information.

In addition to the isochronous transfer of information between the external IO device 10 and the computer system 100, the transfer of information within the computer system 100 may also be isochronous. U.S. patent application Ser. No. 09/110,344, entitled "Architecture for the Isochronous Transfer of Information Within a Computer System," to John I. Garney and Brent S. Baxter, filed on Jul. 6, 1998, discloses an architecture that provides for the isochronous transfer of information within a computer system.

In this case, the IO unit 400 may perform both isochronous and asynchronous information transfers, or "transactions," with the memory controller 300. In addition, the IO unit 400 may have several different transactions to be sent to (or received from) the memory controller 300 at substantially the same time. Similarly, the memory controller 300 may have several different transactions to be sent to (or received from) the IO unit 400.

The connection 500, or "link," between the IO unit 400 and the memory controller 300, however, is typically a "half duplex" link. A half duplex link between two devices is one that lets information be transferred in both directions, that is from the first to the second device and from the second to the first device, but not in both directions at the same time.

Because both the IO unit 400 and the memory controller 300 may each have information ready to be transferred over the half duplex link 500, or "pending" transactions, particular transactions can be selected to be transferred across the link 500, or "scheduled." This scheduling can pose a number of problems.

For example, a memory "read request" transaction sent from the IO unit 400 to the memory controller 300 will result in a memory "read return" transaction from the memory controller 300 to the IO unit 400, containing the requested data, at a later point in time. When the read return transaction is ready, however, another transaction, such as a memory "write" transaction from the IO unit 400 to the memory controller 300 may also be ready to be transferred across the half duplex link 500. Because both transactions cannot be transferred across the half duplex link 500 simultaneously, some form of contention arbitration, priority scheme or flow control procedure is needed to resolve the access conflict.

These methods of resolving access conflicts on the half duplex link 500 may require one or more large data buffers, such as one or more First-In, First-Out (FIFO) data buffers, to store isochronous information when the half duplex link 500 cannot be accessed. In this case, information being transferred, for example, between the IO device 10 and the main memory 200 can be stored to, or retrieved from, various buffers when the half duplex link 500 is not available. This buffering can accommodate delays thereby reducing the gaps in an isochronous stream within the computer system 100.

The contention arbitration and/or large data buffers can increase the cost, lower the performance and make the computer system 100 more difficult to build and test. Moreover, information within the computer system 100 may still not be transferred in a reliable and timely fashion if the delays are too long.

SUMMARY

In accordance with an embodiment of the present invention, transactions are scheduled over a half duplex link between a first device and a second device. Information flowing over the half duplex link is divided into a plurality of service periods. The transfer of a read request transaction, from the first device to the second device, is scheduled in one service period. The transfer of a write transaction, from the first device to the second device, is scheduled such that the write transaction will not be transferred across the half duplex link in the same service period as returning memory read data is transferred across the half duplex link.

In accordance with another embodiment of the present invention, transactions are scheduled over a half duplex link between a first device and a second device. Information flowing over the half duplex link is divided into a plurality of service periods. A first transaction associated with a first agent is scheduled in a first service period according to a global schedule. The global schedule associates the first service period with the first agent. A second transaction associated with a second agent is scheduled in a second service period according to the global schedule. The global schedule associates the second service period with the second agent.

DETAILED DESCRIPTION

An embodiment of the present invention is directed to a half duplex link protocol for isochronous transactions in a computer system. Three techniques may be applied to combine multiple isochronous streams for efficient transmission over a half duplex link. Isochronous transactions are (a) aligned in time to convert to a time synchronous sequence of transactions, as required for (b) a time division multiplexing merge process, that is further (c) time aligned to prevent conflicts on a half duplex link between memory write operations and data returning from previously transferred memory read operations.

Figure 2:
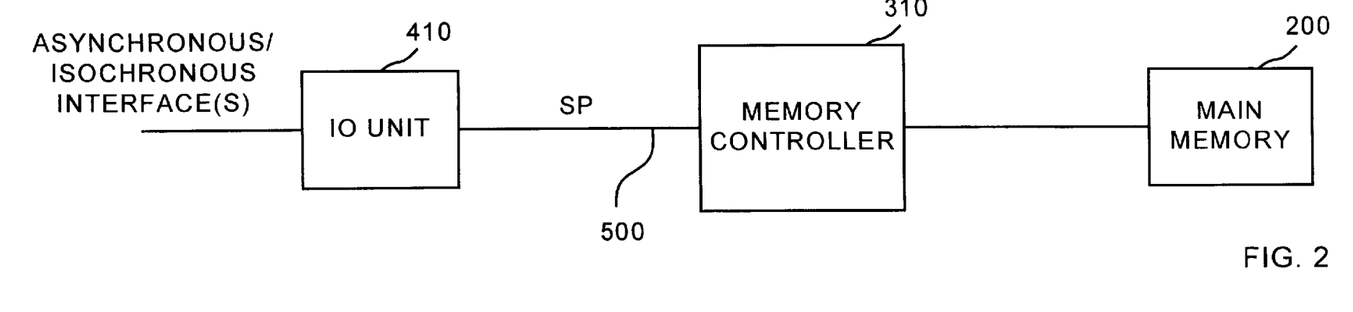
FIGS. 2 and 3 illustrate the use of service periods to schedule isochronous and asynchronous transactions over a half duplex link.
Figure 3:
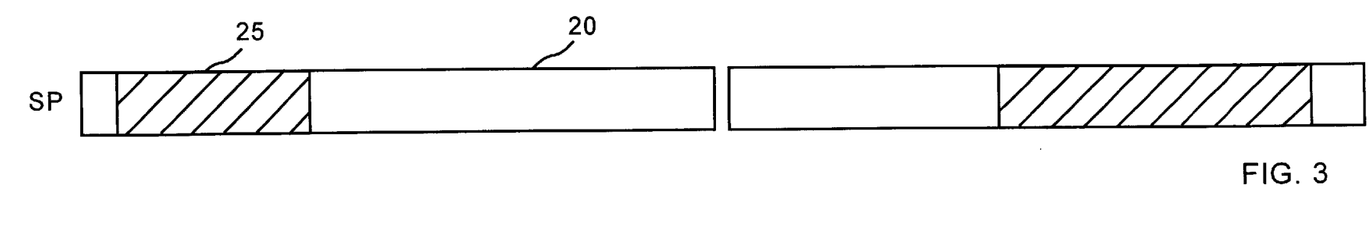

Referring now in detail to the drawings wherein like parts are designated by like reference numerals throughout, FIGS. 2 and 3 illustrate the use of service periods to schedule the transfer of transactions over the half duplex link. In particular, FIG. 2 is a block diagram of a computer system according to an embodiment of the present invention. Both isochronous and asynchronous information may be transferred between, for example, one or more external devices (not shown in FIG. 2) and an IO unit 410. The IO unit 410 transfers information with a memory controller 310 over a half duplex link 500. Information is also transferred between the memory controller 310 and a main memory 200.

As used herein, isochronous and asynchronous information may be "transferred" between the IO unit 410 and the memory controller 310 by sending the information to, or receiving the information from, the memory controller 310. Information may include, for example, memory read requests, memory return data and memory write transactions.

Consider a transfer of information to the memory controller 310. The memory controller 310 may receive both isochronous and asynchronous information from the IO unit 410 to be stored in the main memory 200. For example, the IO unit 410 may send a stream of information to the memory controller 310, and the stream may be divided into a plurality of "service periods." FIG. 3 illustrates how each service period can be used to transfer both isochronous and asynchronous information. Each service period has a first "duration" 20 or amount of information shown as the white portion in FIG. 3, associated with asynchronous information and a second duration 25, or amount of information shown as the shaded portion in FIG. 3, associated with isochronous information.

Although each service period has a single isochronous portion 25, exactly where the isochronous amount of information 25 falls in the service period can vary between service periods. A single service period may contain a number of isochronous memory requests, which may be serviced all at once or distributed throughout the service period. Further, the length of the isochronous amount of information 25 may vary from service period to service period, up to some previously established maximum. That is, the maximum number of isochronous transactions in a single service period may be limited. For purposes of combining one agent's isochronous stream of information with that of another, FIFO buffering may be used to transfer the isochronous information at a particular, pre-specified time during the service period.

As described with respect to FIG. 2, an IO unit 410 may "submit" a memory transaction request to be "transferred" across a half duplex link 500 which is "presented" to a main memory. The main memory 200 can "respond" with read return data which is "transferred" in the opposite direction over the half duplex link 500, to be "consumed" by the IO unit 410. Note that a transaction submitted in one service period may be transferred in the next or a subsequent service period, according to one embodiment of the present invention.

Referring again to FIG. 1, both the IO unit 410 and the memory controller 310 may each submit transactions, including isochronous and/or asynchronous transactions to be transferred over the half duplex link 500. As explained with respect to FIGS. 4 to 7, a half duplex link protocol is used to determine which of the submitted transactions is to be transferred next.

According to one embodiment of the present invention, isochronous memory read requests submitted in one service period are transferred in the next service period (not earlier or later). Also, the memory responds with read return data in one service period, which is transferred over the half duplex link in the next service period (never earlier or later). Write transactions, on the other hand, may be delayed, if necessary, to avoid collisions as described above. Other embodiments may have different rules, so long as the result is that isochronous memory read and memory write requests can be submitted and transferred at previously established rates. An asynchronous memory transaction may be simply transferred whenever possible, on a "best efforts" basis.

Figure 4:
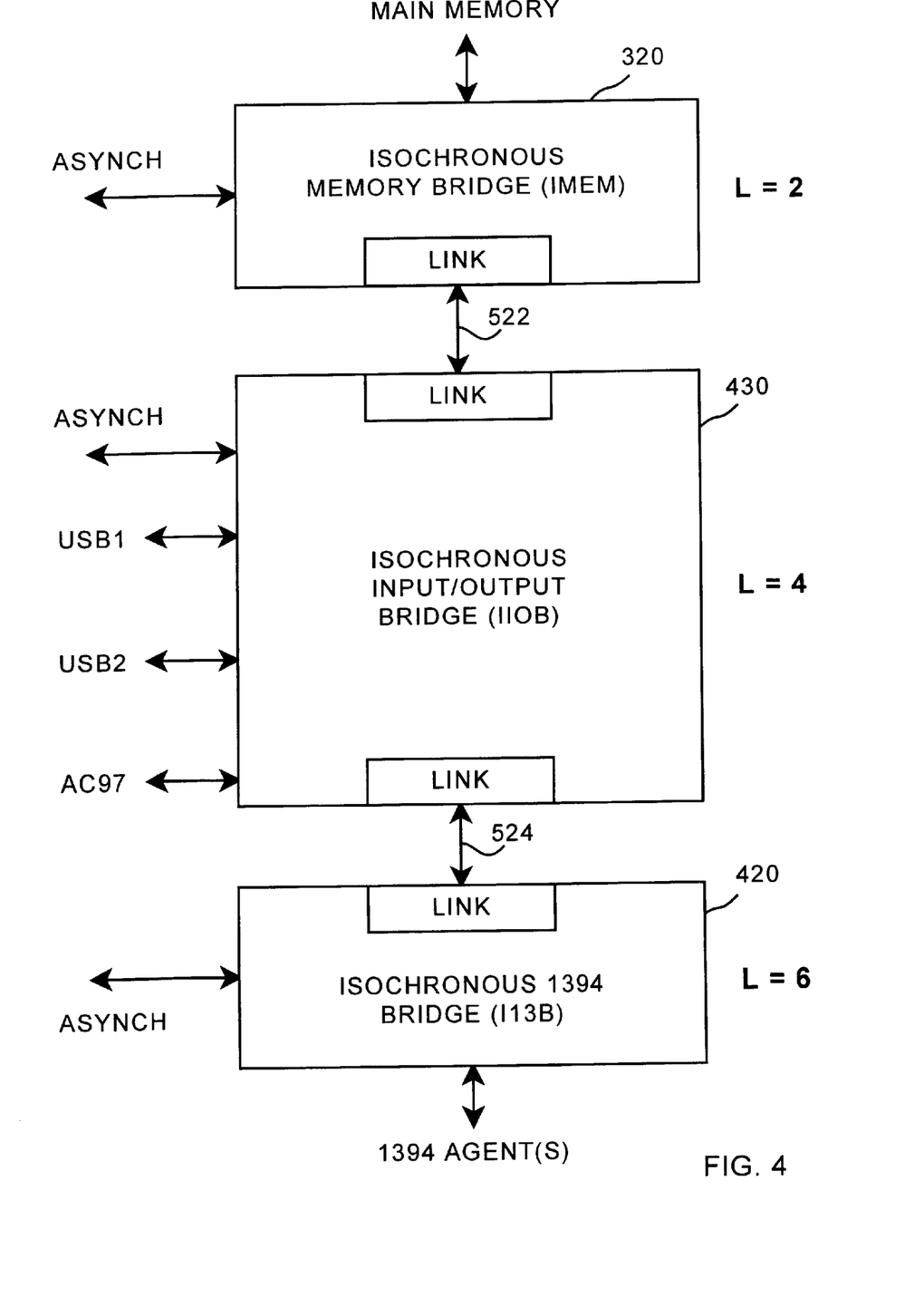
FIG. 4 is a block diagram of a system that uses a half duplex link protocol for isochronous transactions according to an embodiment of the present invention.
Figure 5:
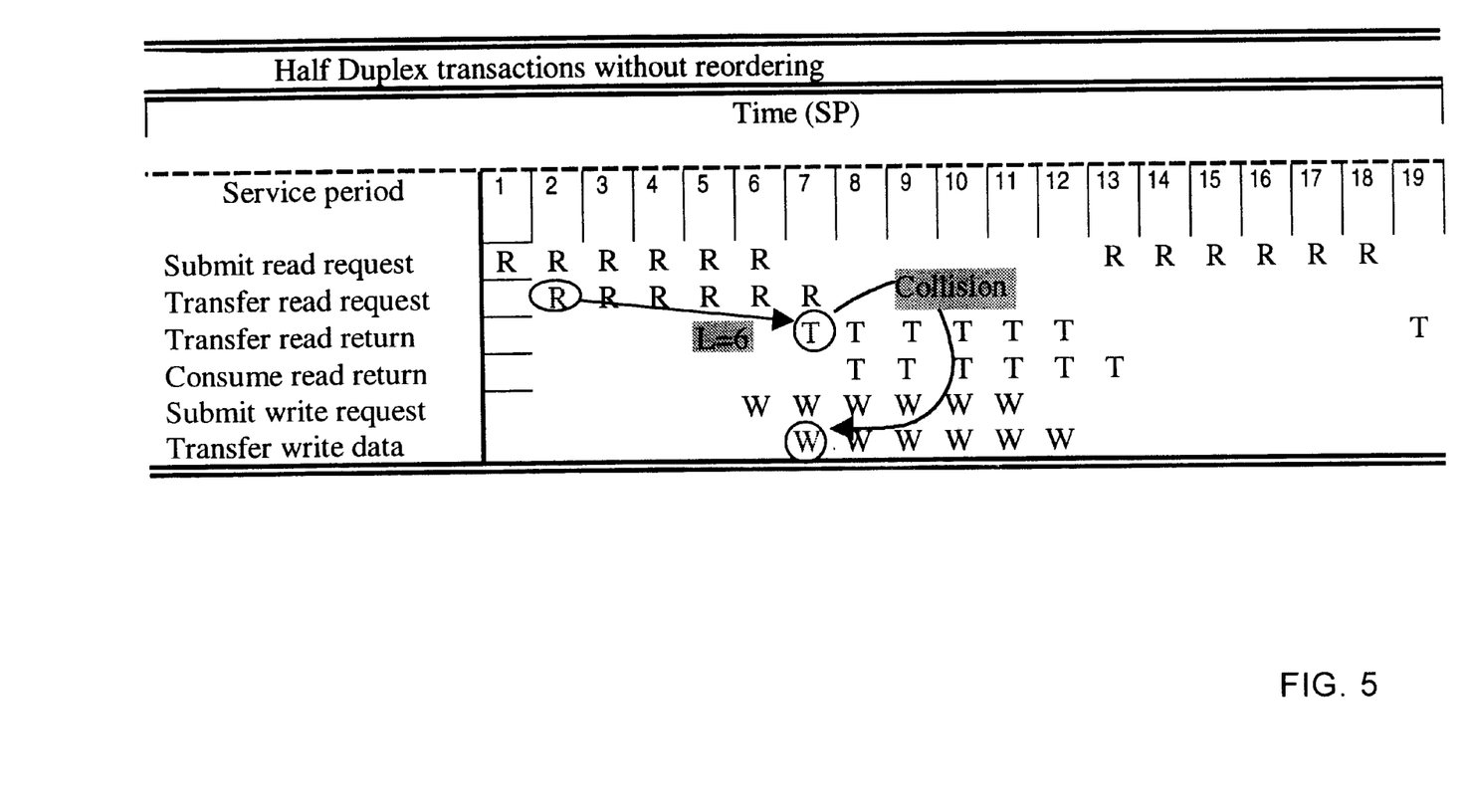
FIG. 5 is a table illustrating how collisions may occur on a half duplex link.

FIG. 4 is a block diagram of a system that uses a half duplex link with a global schedule to combine isochronous transactions according to an embodiment of the present invention. An Isochronous Memory bridge (IMEM) 320 is submits memory read requests (R), which includes a memory address, and memory write transactions (W), which may include a memory address and memory data, to a main memory. In response to a memory read request, the main memory responds with read return data (T).

For purposes of illustration, assume the main memory responds two service periods after being presented with a read request (L=2). Note that L represents the round trip delay, or latency, form IMEM 320 to the main memory and back again. More precisely, the isochronous read return latency is the number of service periods following the one in which a memory read request was submitted to the IMEM 320 to the one before the corresponding return data may be consumed by an Isochronous IO Bridge (IIOB) 430. For an isochronous interface, such as half duplex links 522, 524, the read return latency is the number of service periods following the one in which a read request was submitted to the link unit, until the one before the half duplex link's client may consume the return data. Thus, more remote stages in a memory pipeline, such as the one shown in FIG. 4, have longer memory read latencies (i.e., IMEM: L=2; half duplex link 522: L=4; half duplex link 524: L=6). Other implementations, with different latency values, are possible.

To further illustrate, the IIOB 430 is coupled to the IMEM 320 over the half duplex link 522. Because the IIOB 430 is one step further removed from the main memory, the isochronous read return latency associated with the half duplex link 522 is two service periods longer (L=4). That is, a memory read request is transferred form the IIOB 430 to the IMEM 320 (one service period), the main memory responds two service periods later, after which the return data is transferred back across the half duplex link 522 for a total of four service periods. By extension, an Isochronous 1394 Bridge (I13B) 420 transfers a memory read request over another half duplex link 524, incurring two additional service periods of isochronous memory read latency (L=6). The I13B 420 and the IIOB 430 may comprise, for example, the IO device 410 shown in FIG. 2.

According to an embodiment of the present invention, a half duplex link re-ordering protocol is used to avoid interference between the transfer of read return transactions and write data transactions. Consider FIG. 5, which illustrates how such collisions may occur on the half duplex link 524 between the 113B 420 and the IIOB 430 without the benefit of a suitable re-ordering protocol. A memory read request (R) submitted during service period 1 and transferred across the half duplex link 524 in service period 2 results in a read return transaction transferred back across the half duplex link 524 during service period 7. This is a read latency of six service periods, since the service periods are counted except the one in which the read request is submitted or the return data is consumed. Similarly, memory read requests transferred during service periods 3 to 7 correspond to return data transferred in service periods 8 to 12.

An embodiment of the present invention prevents collisions between the transfer of a write data transaction and a read return transaction in the same service period. For example, each service period may be 13 clock cycles in duration. Each read request transaction (R) may take 2 clock cycles, each read return transaction (T) may take 8 clock cycles and a write request/data transaction (W) may take 11 clock cycles. In this case, a read return transaction (R), a read return transaction (T) plus two cycles for the half duplex link 522 to change direction, totaling 12 clock cycles, can be performed in a single service period. Likewise, a read request transaction (R), a write request/data transaction (W), and two clock cycles to change direction on the half duplex link 522, totaling 13 clock cycles, can be performed in a single service period.

However, a read request transaction (R) and a write request/data transaction (W), plus two clock cycles to change direction on the half duplex link 522, totaling 17 clock cycles, cannot be performed in a single service period. Lengthening the service period to 17 clock cycles would accommodate this combination, but may be undesirable because performance would be reduced in those cases where both read return and write transactions are not present simultaneously.

Figure 6:
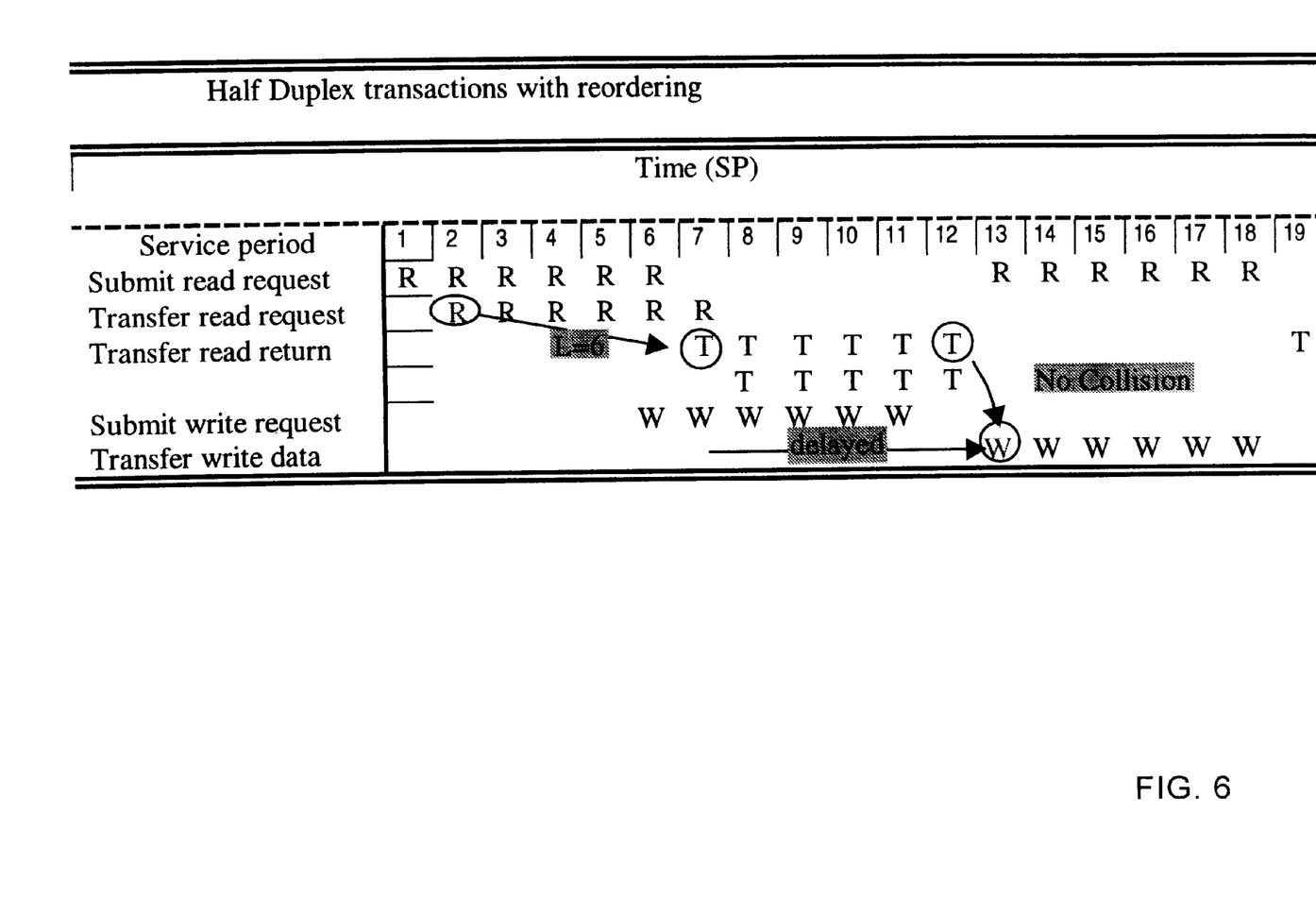
FIG. 6 is a table illustrating half duplex transactions re-ordered according to an embodiment of the present invention.

Under the conditions described above, a write transaction submitted in service period 6 would ordinarily be transferred in service period 7. This, however, would collide with a previously submitted read return transaction whose return data is also transferred in service period 7. According to an embodiment of the present invention, a write transaction (W) is "re-ordered," or delayed, such that it will not collide with a read return transaction (T). FIG. 6 illustrates how the write transactions of FIG. 5 may be re-ordered to prevent such collisions.

As can be seen in FIG. 6, write transactions (W) submitted in service periods 6 to 11 are no longer transferred in service periods 7 to 12. Instead, they are delayed by 6 service periods to be transferred in service periods 13 to 18. This avoids conflict with the read return transactions (T) in service periods 7 to 12.

The re-ordering protocol may be implemented, for example, using a state tracking table, such as an L-bit shift register that is advanced one position each service period. In the example shown in FIG. 6, the read request transaction (R) submitted in service period 1 may result in a "1" being placed into a 6-bit shift register in service period 2. The "1" would then advance through the shift register, one position per service period, eventually indicating that the half duplex link is not available for transferring a write transaction during service period 7. Each succeeding read request transaction (R) does the same, with the result that "1" indications appear at the output of the 6-bit shift register in service periods 7–12, thus delaying transfer of the write transactions by six service periods.

The arrangements described above comprise one example of how an isochronous half duplex link may be operated. Other arrangements may allow other variations in packet sizes, different numbers of read and write transactions within a service period or different combinations of read request transactions, read return transactions and write transactions. Further, it is possible to separate write request transactions from write data transactions. These represent only a few of the possible variants of the present invention.

Figure 7:
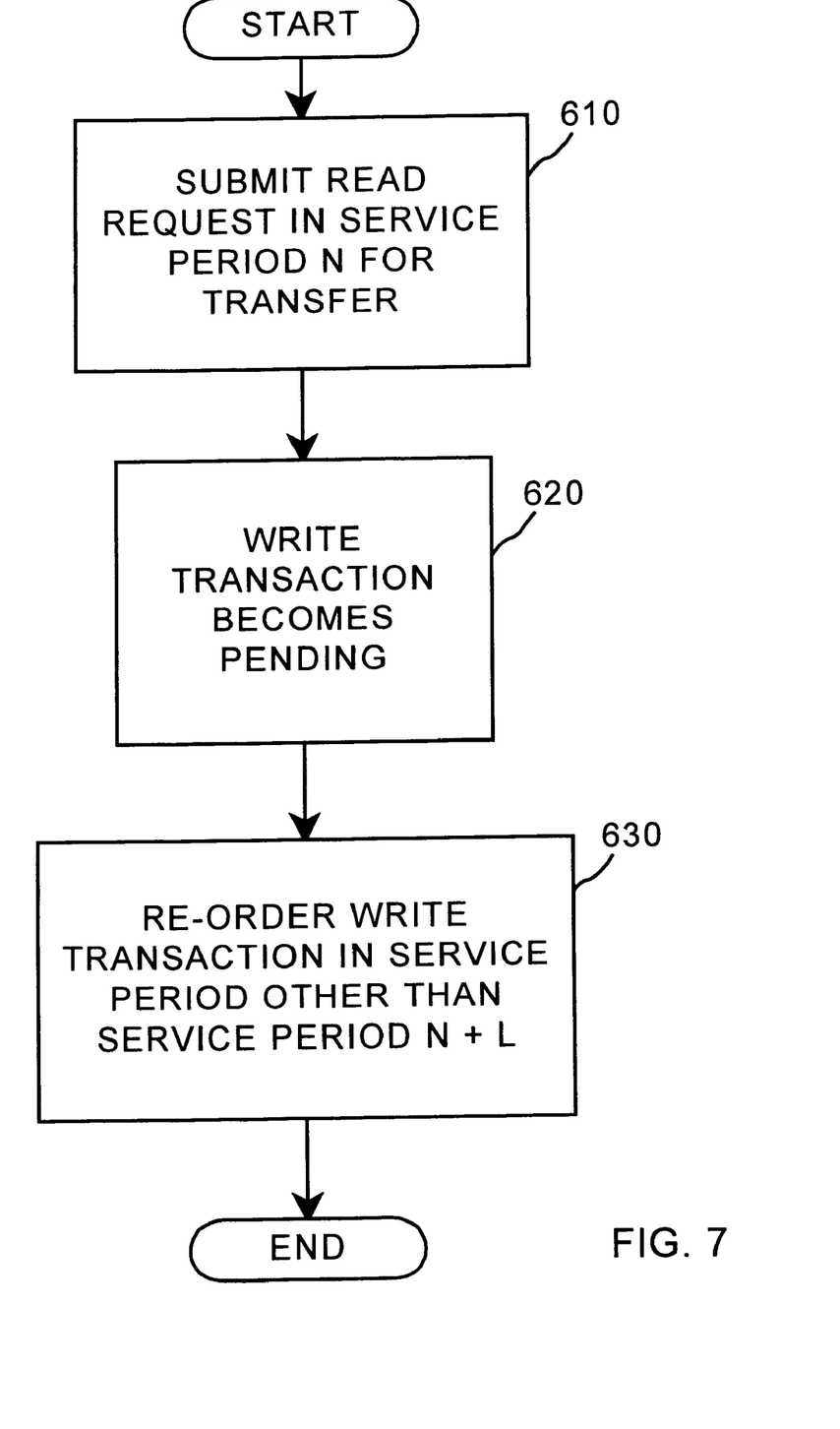
FIG. 7 is a flow diagram of a method using a half duplex link re-ordering protocol for isochronous transactions according to an embodiment of the present invention.

FIG. 7 is a flow diagram of a method using a half duplex link re-ordering protocol for isochronous transactions according to an embodiment of the present invention. At 610, a read request transaction is submitted in service period N for transfer over the half duplex link. This will result in a read return transaction being transferred over the half duplex link in service period N+L. Therefore, a memory write transaction will be delayed such that it is not transferred during service period N+L.

As described above, the present invention prevents conflict between memory read return transactions and memory write transactions, transferred over a half duplex link. As will now be explained, this is desirable when multiple independent isochronous agents share use of the half duplex link, each agent having different bandwidth demands and different service periods to support different external isochronous interconnect technologies.

For example, in addition to information from one or more 1394 agents, the IIOB 430 may also receive information from one or more Audio Codec 97 (AC97) or Universal Serial Bus (USB) agents. Detailed AC97 interface information can be found in Audio Codec '97 Revision 2.1, dated May 22, 1998, available from Intel Corporation. Detailed USB interface specifications can be found in the "Universal Serial Bus Specification Revision 1.0," dated Jan. 15, 1996, Copyright© 1996, Compaq Computer Corporation, Digital Equipment Corporation, IBM PC Company, Intel Corporation, Microsoft Corporation, NEC and Northern Telecom. The IIOB 430 may also receive information from or send isochronous information to other isochronous agents, such as a video device, if desired.

According to an embodiment of the present invention, a "global" schedule may be used to combine isochronous information from these different agents. Isochronous transactions are submitted from multiple devices in an interleaved fashion. A conflict resolution method of the kind described above allows each agent to use split transaction operations. To create an efficient global schedule, the read return latency (e.g., time between transfer of a read request until transfer of a read return) must be taken into consideration.

According to an embodiment of the present invention, the global schedule determines when each agent can submit read request or write transactions across the half duplex link. The apparatus described previously prevents contention between read return transactions and write transaction for a single agent, as well as prevention contention between transactions generated by different agents. The arrangement also prevents contention between agents that may access memory via half duplex links that are closer to main memory.

Figure 8:
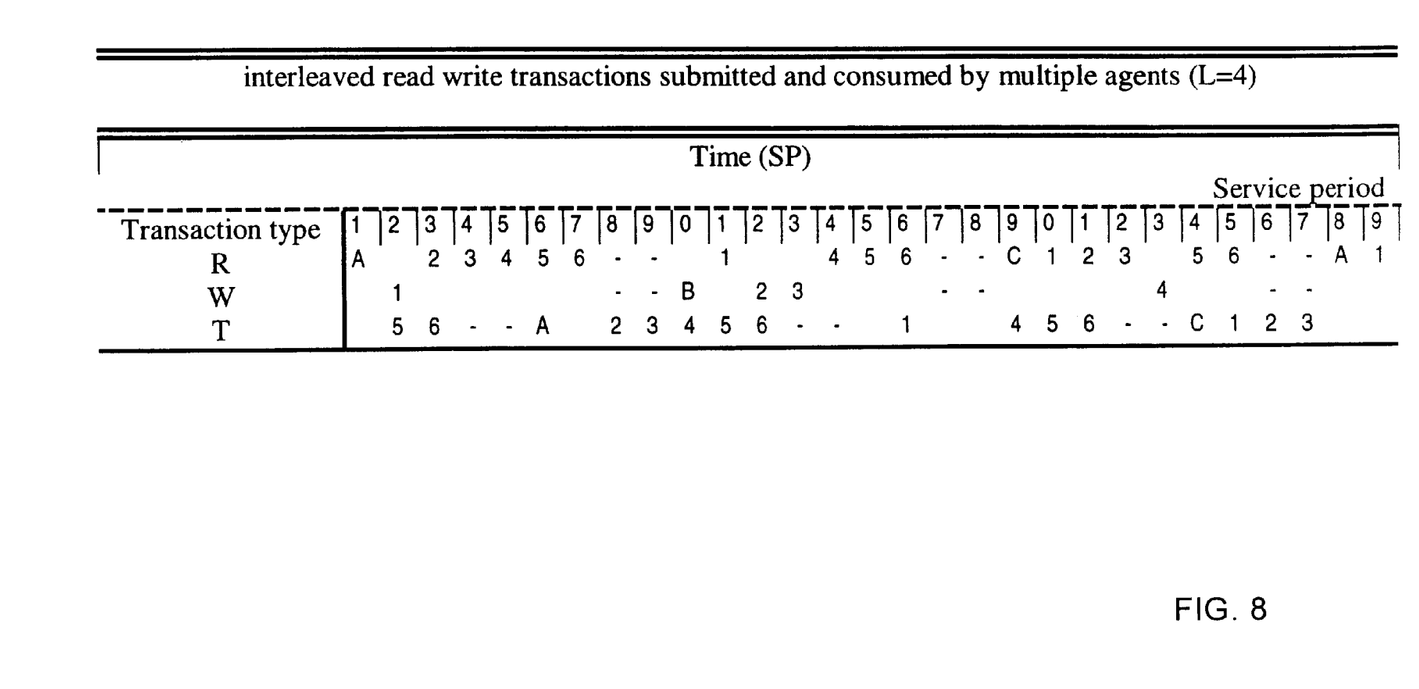
FIG. 8 is a table illustrating the result of submitting interleaved isochronous service transactions according to an embodiment of the present invention.

This may be achieved, for example, by allowing one of {USB1, USB2 and AC97} to submit a read or write request every ninth service period (requests labeled A, B, C) and the I13B 420 to submit a read or a write request in six remaining service periods (requests numbered 1 to 6). Each of {USB1, USB2 and AC97} can thus submit a read or write request once out of every 27 service periods. In an example shown in FIG. 8, the I13B 420 submits a write transaction in service period 2 as does USB2 in service period 10, etc. Two out of every nine service periods are labeled "–" and are reserved for other purposes, such as for asynchronous transaction submissions. In this example, an asynchronous agent can submit only a read or a write transaction in any one service period, but not both. The result of thus submitting interleaved isochronous service transactions is illustrated in FIG. 8. Collisions between read return transactions and write transactions in the composite stream are prevented as described above.

Figure 9:
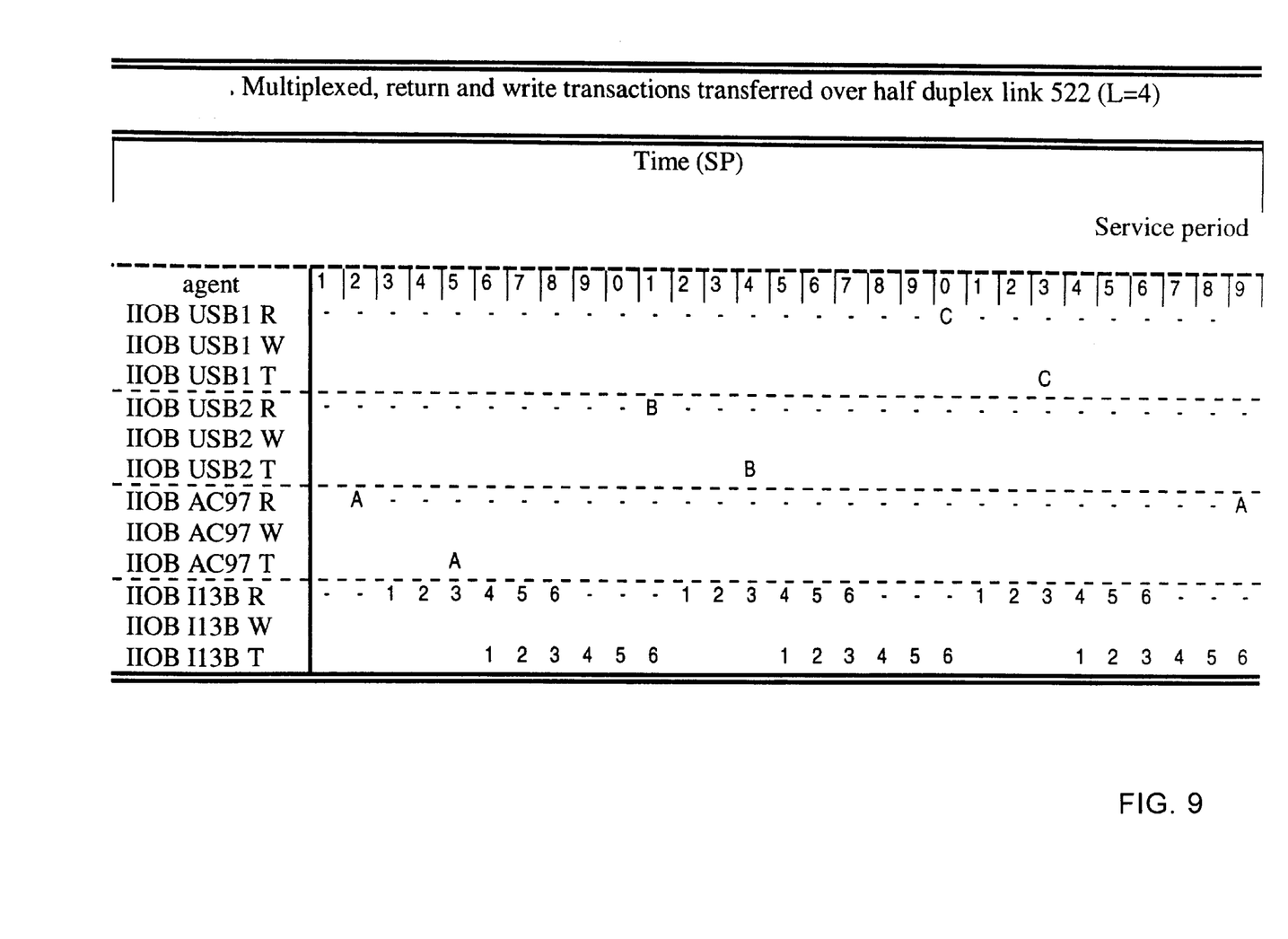
FIG. 9 is a table illustrating an example of a global schedule for transactions transferred over a half duplex link according to an embodiment of the present invention.

FIG. 9 illustrates an example of a global schedule for transactions transferred over half duplex link 522 shown in FIG. 4. A number in a cell indicates that a I13B transaction is transferred during that service period. An "A" indicates that a AC97 transaction is transferred that service period, while a "B" or a "C" indicates that a USB1 or a USB2 transaction is transferred in that service period. Finally, a "–" indicates that the service period may not be used by an isochronous agent but is reserved for other purposes, such as for asynchronous transactions.

In this way, interconnects used in memory controller chipsets may implemented as half duplex links to reduce cost and to provide, for example, a memory system capable of reliable isochronous service.

Although various embodiments are specifically illustrated and described herein, it will be appreciated that modifications and variations of the present invention are covered by the above teachings and within the purview of the appended claims without departing from the spirit and intended scope of the invention. For example, although specific re-ordering implementations were used to illustrate embodiments of the present invention, it will be appreciated that other implementations will also fall within the scope of the invention. Moreover, the present invention applies to a broad range of topologies for connecting, for example, memory and other computing devices, and is therefore a general architectural approach that includes a broad range of specific implementations. In addition, although particular standards and techniques were described with respect to the isochronous transfer of information, it will be understood that the present invention is not limited to a particular standard or technique. Finally, although software or hardware are described to control certain functions, such functions can be performed using either software, hardware or a combination of software and hardware, as is well known in the art. As is also known, software may be stored, such as in memory, in the form of instructions, including microcode instructions, adapted to be executed by a processor. As used herein, the phrase "adapted to be executed by a processor" encompasses instructions that need to be translated before being executed by the processor.

What is claimed is:

1. A method of scheduling the transfer of transactions over a half duplex link between a first device and a second device, information flowing over the half duplex link being divided into a plurality of service periods, comprising:

scheduling the transfer of a read request transaction from the first device to the second device in one service period, wherein the read request to cause memory read data to be returned from the second device to the first device; and scheduling unilaterally by the first device the transfer of a write transaction from the first device to the second device, such that the write transaction will not be transferred across the half duplex link in the same service period as the returning memory read data is transferred across the half duplex link.

2. The method of claim 1, wherein the read request transaction is a memory read request transaction and the write transaction is a memory write transaction.

3. The method of claim 1, further comprising:

updating a state table when scheduling the transfer of the read request transaction, the update reflecting that a read return transaction will occur in a determinable subsequent service period;

wherein said scheduling the transfer of the write transaction is performed according to information in the state table.

4. The method of claim 3, wherein said updating of the state table comprises advancing an serial bit shift register.

5. The method of claim 1, further comprising:

delaying transfer of a write transaction to allow a read return transaction to be transferred in a given service period.

6. An apparatus to schedule transactions over a half duplex link between a first device and a second device, information flowing over the half duplex link being divided into a plurality of service periods, comprising:

a communication port configured to communicate with the first device; and a scheduling unit coupled to said communication port and configured to (1) schedule a transfer of a read request transaction from the first device to the second device in one service period, wherein the read request to cause memory read data to be returned from the second device to the first device and (2) schedule unilaterally by the first device the transfer of a write transaction from the first device to the second device, such that the write transaction will not be transferred across the half duplex link in the same service period as the returning memory read data is transferred across the half duplex link.

7. The apparatus of claim 6, wherein said scheduling unit comprises a serial bit shift register.

8. The apparatus of claim 6, wherein the first device comprises an IO unit and the second device comprises a memory controller.

9. A memory system, comprising:
    an Input Output (IO) unit;
    a memory controller;
    a half duplex link coupled between said IO unit and said memory controller, information flowing over the half duplex link being divided into a plurality of service periods; and
    a scheduling unit coupled to said IO unit and configured to (1) schedule a transfer of a read request transaction from the first device to the second device in one service period, wherein the read request to cause memory read data to be returned from the second device to the first and (2) schedule unilaterally by the first device the transfer of a write transaction from the first device to the second device, such that the write transaction will not be transferred across the half duplex link in the same service period as the returning memory read data is transferred across the half duplex link.

10. The apparatus of claim 9, wherein said scheduling unit comprises a serial bit shift register.

11. An article of manufacture comprising a computer-readable medium having stored thereon instructions adapted to be executed by a processor, the instructions which, when executed, cause the processor to schedule transactions over a half duplex link between a first device and a second device, information flowing over the half duplex link being divided into a plurality of service periods, comprising:
    scheduling the transfer of a read request transaction from the first device to the second device in one service period, wherein the read request to cause memory read data to be returned from the second device to the first device; and
    scheduling unilaterally by the first device the transfer of a write transaction from the first device to the second device, such that the write transaction will not be transferred across the half duplex link in the same service period as the returning memory read data is transferred across the half duplex link.

12. A method of scheduling transactions over a half duplex link between a first device and a second device, information flowing over the half duplex link being divided into a plurality of service periods, comprising:
    scheduling the transfer of a first transaction associated with a first agent in a first service period according to a global schedule, the global schedule associating the first service period with the first agent; and
    scheduling the transfer of second transaction associated with a second agent in a second service period according to the global schedule, the global schedule associating the second service period with the second agent.

13. The method of claim 12, wherein the global schedule is configured such that transactions associated with different agents will not be transferred in the same service period.

14. The method of claim 12, wherein the global schedule includes transactions at a plurality of locations in a system, the plurality of locations having different memory read return latencies.

15. The method of claim 12, wherein the first agent and second agent have different bandwidth requirements, and the global schedule allocates service periods according to the agent's bandwidth requirements.

16. The method of claim 12, wherein one of the first device and the second device is associated with one of a 1394 agent, a video agent, a universal serial bus agent and an audio codec agent.

17. An apparatus to schedule transactions over a half duplex link between a first device and a second device, information flowing over the half duplex link being divided into a plurality of service periods, comprising:
    a communication port configured to communicate the first device; and
    a scheduling unit coupled to said communication port and configured to (1) schedule the transfer of a first transaction associated with a first agent in a first service period according to a global schedule, the global schedule associating the first service period with the first agent and (2) schedule the transfer of second transaction associated with a second agent in a second service period according to the global schedule, the global schedule associating the second service period with the second agent.

18. The apparatus of claim 17, wherein the global schedule is configured such that transactions associated with different agents will not be transferred in the same service period.

19. The apparatus of claim 17, wherein the global schedule includes transactions at a plurality of locations in a system, the plurality of locations having different memory read return latencies.

20. The apparatus of claim 17, wherein the first agent and second agent have different bandwidth requirements, and the global schedule allocates service periods according to the agent's bandwidth requirements.

21. The apparatus of claim 17, wherein one of the first agent and the second agent comprise one of a 1394 agent, a video agent, a universal serial bus agent and an audio codec agent.

22. A memory system, comprising:
    an Input Output (IO) unit;
    a memory controller;
    a half duplex link coupled between said IO unit and said memory controller, information flowing over the half duplex link being divided into a plurality of service periods; and
    a scheduling unit coupled to said IO unit and configured to (1) schedule the transfer of a first transaction associated with a first agent in a first service period according to a global schedule, the global schedule associating the first service period with the first agent, and (2) schedule the transfer of second transaction associated with a second agent in a second service period according to the global schedule, the global schedule associating the second service period with the second agent.

23. An article of manufacture comprising a computer-readable medium having stored thereon instructions adapted to be executed by a processor, the instructions which, when executed, cause the processor to schedule transactions over a half duplex link between a first device and a second device, information flowing over the half duplex link being divided into a plurality of service periods, comprising:
    scheduling the transfer of a first transaction associated with a first agent in a first service period according to a global schedule, the global schedule associating the first service period with the first agent; and
    scheduling the transfer of second transaction associated with a second agent in a second service period according to the global schedule, the global schedule associating the second service period with the second agent.

* * * * *